United States Patent [19]

Gasbarro

[11] 4,067,085

[45] Jan. 10, 1978

[54] AUTOMATIC POULTRY CUTTING APPARATUS

[76] Inventor: Geno N. Gasbarro, 1305 NoeBixby, Columbus, Ohio 43227

[21] Appl. No.: 656,101

[22] Filed: Feb. 9, 1976

[51] Int. Cl.² ............................................. A22C 21/00
[52] U.S. Cl. ............................................. 17/11; 17/52
[58] Field of Search .................... 17/11, 52, 44.1, 57, 17/61

[56] References Cited

U.S. PATENT DOCUMENTS

| 2,811,742 | 11/1957 | Jackson | 17/11 |
|---|---|---|---|
| 3,564,644 | 2/1971 | Cannon | 17/11 |
| 3,624,863 | 12/1971 | Gasbarro | 17/11 |
| 3,639,945 | 2/1972 | Duncan et al. | 17/11 |
| 3,943,600 | 3/1976 | Cramer | 17/11 |
| 3,946,461 | 3/1976 | Martin | 17/11 |
| 3,950,820 | 4/1976 | Duncan et al. | 17/11 |

*Primary Examiner*—Ralph T. Rader
*Attorney, Agent, or Firm*—Cennamo, Kremblas & Foster

[57] ABSTRACT

An improved poultry cutting apparatus which is characterized by a unique combination which includes an inner mandrel adapted to retain a dressed poultry carcass thereon which is movably mounted to advance to a cutting station. The cutting station includes a unique enclosure which is adapted to receive the poultry carcass on the mandrel and cooperatively therewith maintain the proper positioning of the poultry carcass during the actual cutting operation. The enclosure is provided with a plurality of slots adapted to receive movably mounted cutting blades which are selectively disposed and actuated to cut the poultry carcass into a given desired number of selected pieces.

9 Claims, 12 Drawing Figures

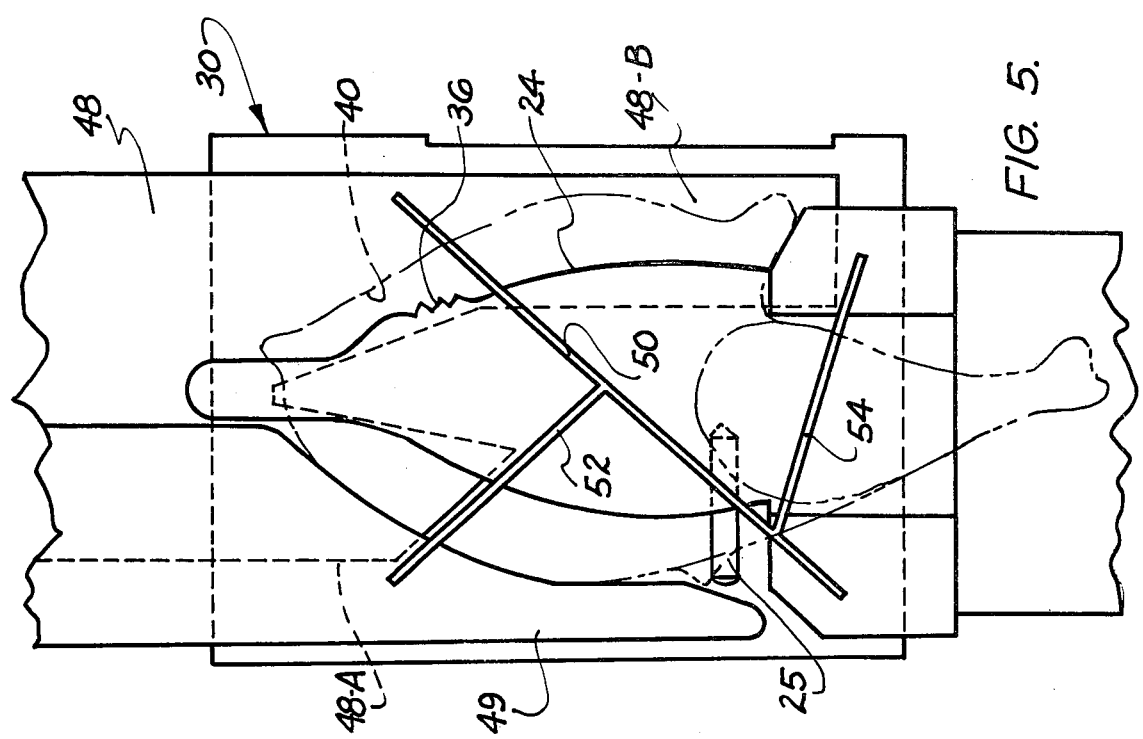
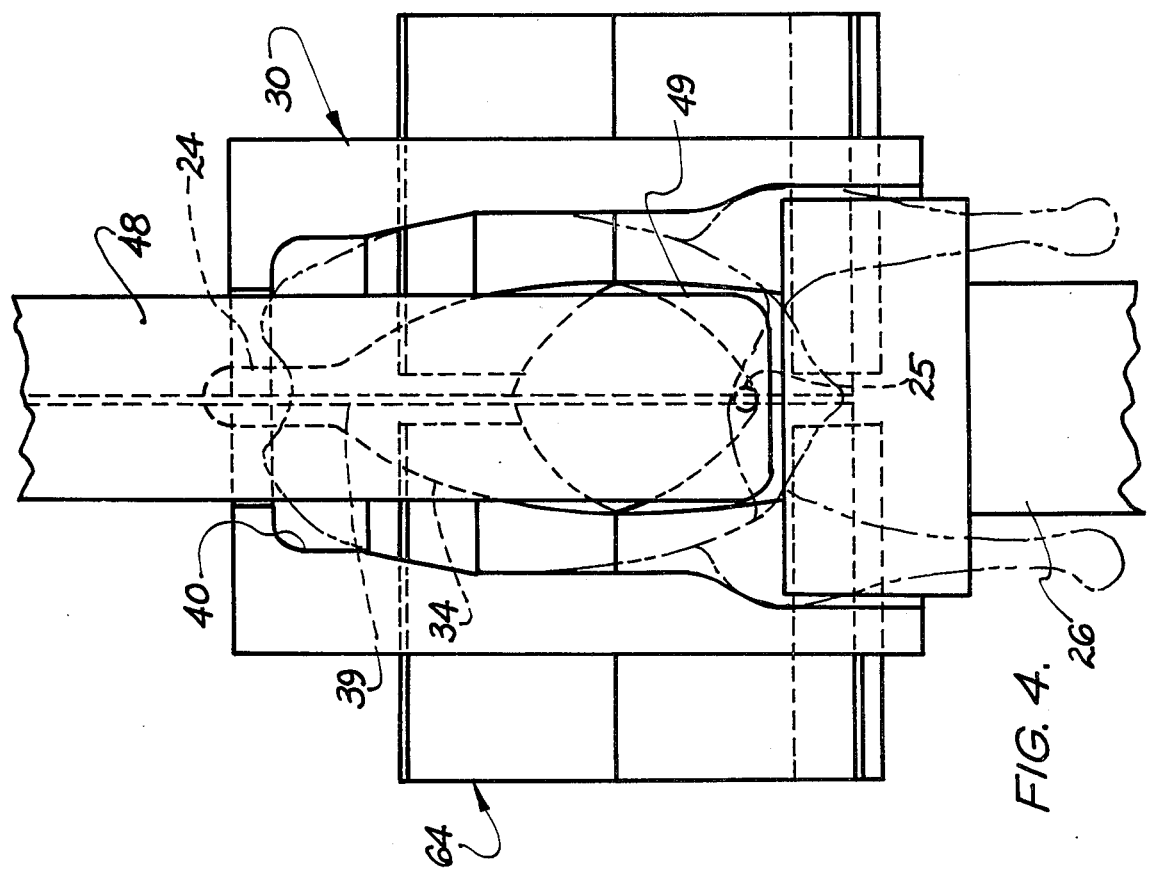

AUTOMATIC POULTRY CUTTING APPARATUS

BACKGROUND

The present invention relates generally to an automatic poultry cutting apparatus and represents an improvement of a prior apparatus disclosed in U.S. Pat. No. 3,624,863 which issued on Dec. 7, 1971.

Generally, most poultry which are cut and packaged for the various retail or fast food restaurant outlets are cut in six, eight or nine selected pieces.

At present, most, if not all, commercially prepared poultry are manually cut utilizing rotating saws or blades.

The present apparatus overcomes the drawbacks of this manual process and further improves my prior invention in that it permits poultry to be automatically cut in a faster, more accurate, efficient, and safer manner than any prior apparatus.

One of the major problems which has for many years hampered automated poultry cutting is the difficulty of maintaining consistent and reliable cuts using an automated cutting device. The inherent nature of a dressed poultry carcass makes it very difficult to accomplish this important feature. My prior apparatus worked satisfactorily and was sound in principle to obtain the desired cuts, however, the degree of consistency in successive cuts and integrity of completeness of each cut is significantly improved by the present invention.

SUMMARY OF INVENTION

The present invention represents a unique solution to the automated poultry cutting and an important improvement of my prior invention disclosed in U.S. Pat. No. 3,624,863.

The present invention includes a poultry receiving enclosure which cooperates with a movably mounted retaining mandrel to achieve vastly improved stability of the poultry body during the cutting operation. Further, this construction improves the cutting action itself by also providing a guide means for the cutting blades. The combination of these features insures an accurate and positive cutting action which far exceeds any prior method or means to automatically cut poultry.

It has long been recognized that the skin of a poultry carcass is very difficult to completely cut and represents a severe drawback to automated operation. However, the present invention provides means to improve the completeness of the cut through both the flesh of the carcass and the skin to more readily provide well separated pieces.

Further, the present invention includes a lesser number of linear reciprocating blades than my prior apparatus by providing a pair of rotating blades ahead of the poultry receiving enclosure to sever the wing portions from the remainder of the carcass prior to cutting the carcass. This construction not only simplifies the overall cutting operation and design but also improves the quality of the heretofore difficult wing cut itself.

Additional improvement resulting from the cooperation between a mandrel and poultry receiving enclosure include permitting a reduction in overall size which results in a more compact unit and a design which promotes even greater safety to the operator.

OBJECTS

It is therefore a primary object of the present invention to provide an automatic poultry cutting apparatus which has improved cutting efficiency, accuracy and safety compared to prior art apparatus.

It is another object of the present invention to provide an apparatus of the type described which includes a unique enclosure having an inner cavity which generally conforms to the outline of a poultry carcass and which is adapted to receive a poultry carcass to aid in maintaining that carcass in a stable position during a cutting cycle.

It is another object of the present invention to provide an apparatus of the type described wherein the unique enclosure for receiving the poultry carcass also serves as a guide means for certain of the cutting blades to assure an efficient and consistent cutting action on the poultry carcass.

It is a further object of the present invention to provide an apparatus of the type described which is of compact design to reduce the floor space required in an operating plant.

It is still another object of the present invention to provide an apparatus of the type described which includes a construction which permits two units to be placed adjacent one another, if desired, and requires only a single operator for both units or alternatively which may be constructed as a dual unit operated by a single operator.

Further objects and advantages of the present invention will be apparent from the following description, reference being had to the accompanying drawings wherein a preferred form of embodiment of the invention is clearly shown.

IN THE DRAWINGS

FIG. 4 is a front elevational view of a portion of the apparatus shown in FIG. 1 illustrating the relative position of a poultry carcass mounted on the mandrel which is disposed within the poultry retaining enclosure and shows the vertical cutting blade disposed in a fully extended cutting position;

FIG. 5 is a side elevational view of that portion of the apparatus of FIG. 1 shown in FIG. 4;

DETAILED DESCRIPTION

Figure 1:
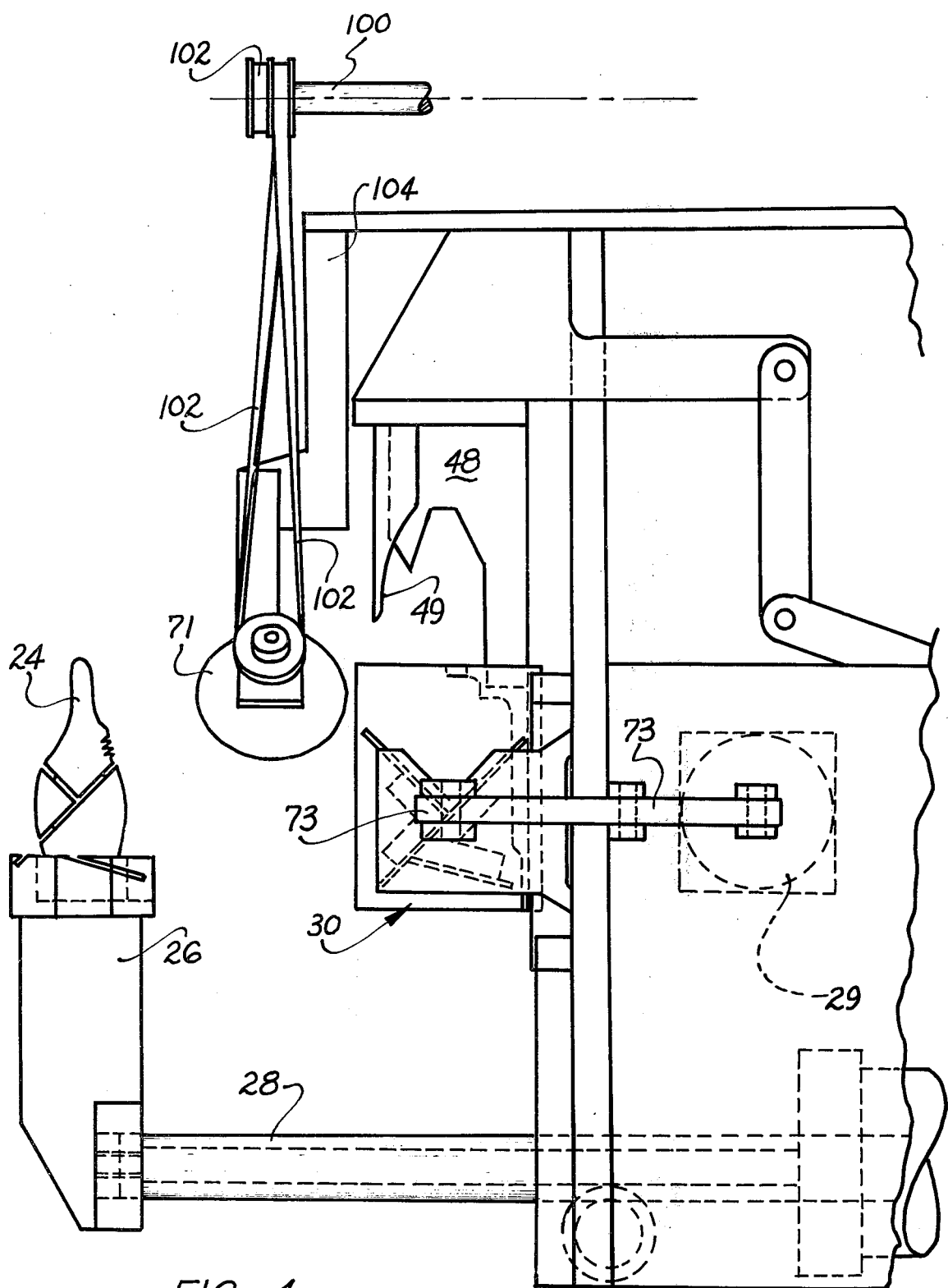
FIG. 1 is a side elevational view of a poultry cutting apparatus constructed in accordance with the present invention illustrating the main features of the present invention.

A poultry cutting apparatus constructed in accordance with the present invention is illustrated in FIG. 1 and includes a base frame means, indicated generally at 20. Frame 20 preferably is mounted on wheels, such as at 22 to provide mobility to enable ease of positioning the apparatus in a given plant site.

A poultry retaining mandrel 24 is mounted on a support member 26, which in turn is fixed on a pair of guide rods 28. Rods 28, in turn, may be slideably mounted within frame means 20 in any conventional manner. A piston 29 is fixed on a connecting member 31 which is joined to rods 28. Piston 29 is reciprocably mounted in a conventional hydraulic cylinder mounted within frame means 30 between extended and retracted positions. The extended position is shown in FIG. 1 and the retracted position is defined when mandrel 24 is disposed within a poultry retaining enclosure 30.

Poultry retaining enclosure 30 is mounted to frame means 20 in a position aligned with mandrel 24 and adapted to receive mandrel 24 with a poultry carcass mounted on the mandrel upon actuation of piston 29 to move mandrel 24 toward enclosure 30.

Figure 9:
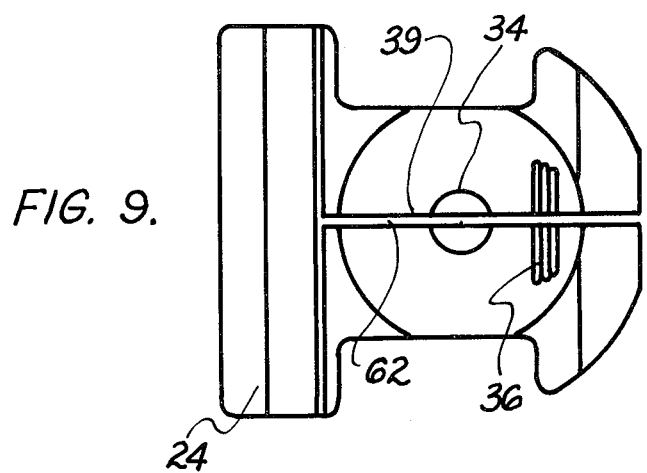
FIG. 9 is a top plan view of the poultry retaining mandrel which forms a portion of the apparatus shown in FIG. 1.
Figure 10:
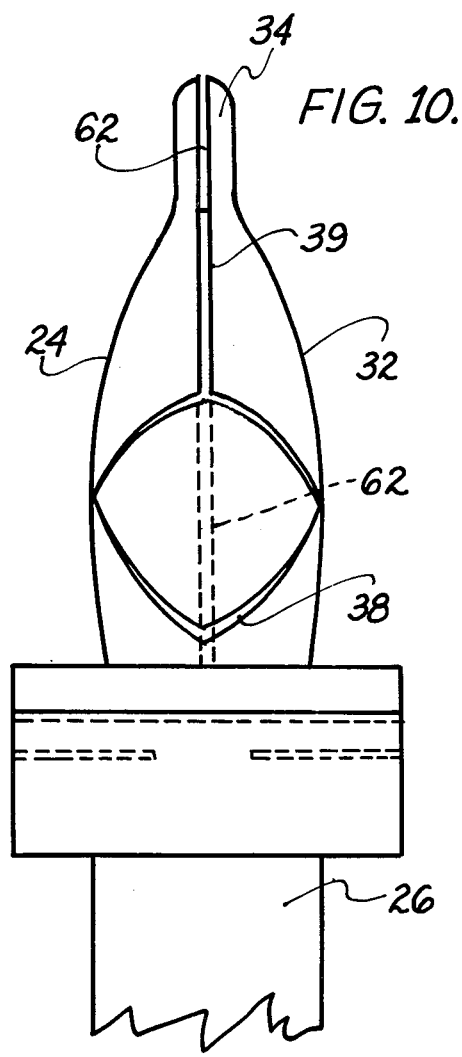
FIG. 10 is a front elevational view of the mandrel shown in FIG. 9.
Figure 11:
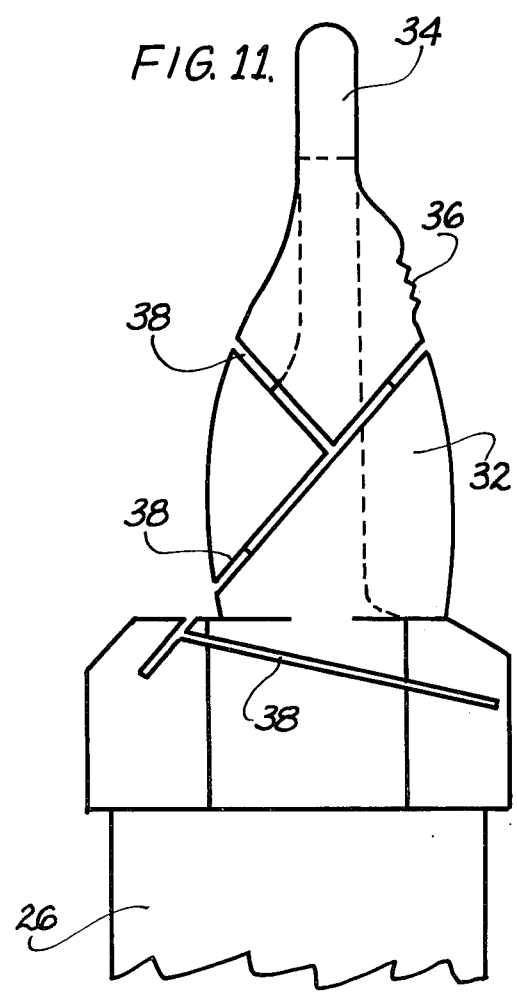
FIG. 11 is a side elevational view of the mandrel shown in FIGS. 9 and 10.

Referring specifically to FIGS. 9-11, mandrel 24 generally conforms to the inner body cavity of a commercially dressed poultry carcass. For purposes of descriptive illustration, the type of poultry referred to herein will be chicken, however, other types of poultry or fowl could be substituted therefore without departing from the spirit of the present invention.

Mandrel 24 includes a body portion 32 and a narrowed neck portion 34. Body portion 32 is provided with a plurality of indentations or ridges 36 which are disposed to generally conform to and engage the rib section of the chicken carcass positioned on the mandrel.

A plurality of slots 38, which are disposed to receive certain of the cutting blades described herein are disposed adjacent to given areas of the chicken carcass at predetermined locations which correspond to the area in which the cutting blades will strike the carcass and provide a clearance to receive a portion of the leading edges of the blades. A vertical slot 39 is provided which receives a vertical blade, which is described fully later herein.

The dimensions of mandrel 24 should conform relatively closely to the body cavity of the chicken mounted thereon to aid in retaining the chicken carcass in a fixed position on the mandrel.

Since commercially dressed chicken are classified by size within a tolerance of only a few ounces, a given size mandrel may be appropriately manufactured to handle a given chicken size classification. Therefore a large volume of chicken in the same size classification can be processed using a given size mandrel.

Further, mandrel 24 can be removably mounted, if desired, to enable one to readily change mandrels as needed.

Figure 6:
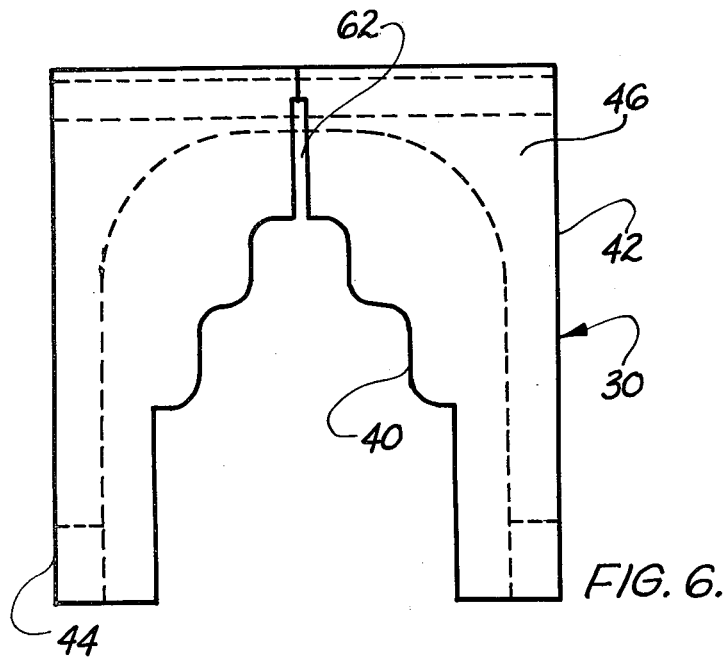
FIG. 6 is a top plan view of the poultry retaining enclosure which forms a portion of the cutting apparatus shown in FIG. 1.
Figure 7:
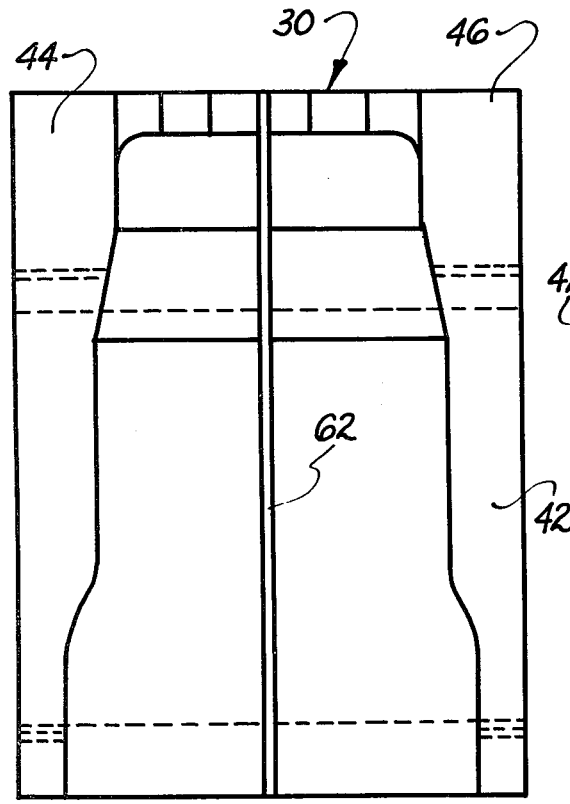
FIG. 7 is a front elevational view of the enclosure shown in FIG. 6.
Figure 8:
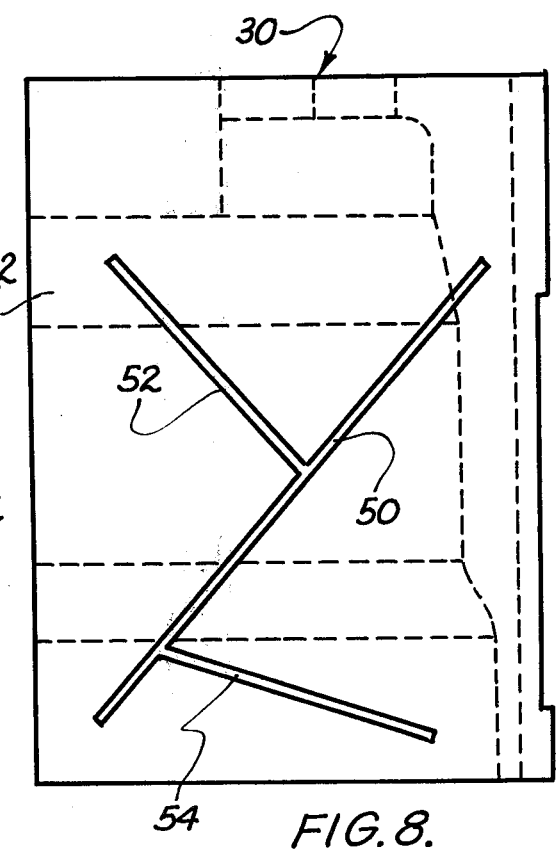
FIG. 8 is a side elevational view of the enclosure shown in FIGS. 6 and 7.

Referring now to FIGS. 6-8, poultry retaining enclosure, indicated generally at 30, includes an inner cavity 40 which is shaped to generally conform to the outline of a dressed poultry carcass at given predetermined locations. Enclosure 30 is adapted to receive mandrel 24 carrying a poultry carcass in a predetermined atitude which defines a cutting station or zone.

The shape and inner dimensions of cavity 40 should be such that the poultry carcass is substantially in contact with at least certain portions of the inner walls. The carcass is, in effect, contained between the mandrel and the inner surfaces of cavity 40 particularly in the general areas where the desired cuts are located. In this manner, the carcass is contained against movement under the force applied by the blades and a more efficient and accurate cut is obtainable.

Enclosure 30 also serves an additional function. The slots in the walls act as a guide and support means for certain of the cutting blades during the cutting operation.

This dual function and cooperation of the mandrel and enclosure 30 is very important to obtain the precise location of the multiple cuts within commercially desirable tolerances. To obtain high accuracy of cut location in a consistent, repetitive manner, it has been found that not only must the poultry carcass be retained in a reasonably fixed position; but further, the cutting blades must be retained as closely as possible to their intended line of travel as they initially strike the poultry carcass and as they continue through the flesh of the carcass.

The blades, moving at sufficient speed to cut the carcass, tend to deflect from their initial line of travel as they strike the poultry carcass due to the unusual texture and make up of the poultry carcass which has been found to possess a relatively high degree of resiliency.

The combination and cooperation of a retaining mandrel and the retaining enclosure with its attendant dual functions overcomes this difficulty to a highly satisfactory degree and provides the desired cuts at least as well as manual cutting, and in most instances, better than manual cutting.

Further, it should be noted that the above structural combination also aids greatly to achieve a higher degree of completeness of each cut, particularly with reference to severing the poultry skin. The skin portion tends to stretch when the blade strikes the carcass. This problem in cutting the skin as completely as possible is compounded by the resilient quality of the flesh under the skin as described above.

In the present invention, this problem is significantly lessened due to the more stable positioning of the poultry body during the cutting operation and by the decrease in the tendency of the blades to deflect from the intended line of travel. Both of these features tend to provide a more complete cut through the poultry skin.

Specifically, enclosure 30 includes a pair of side walls 42 and 44 and a top wall 46 and front wall 47 which is provided with an opening adapted to receive a vertically movable closure member 49 upon which is fixedly mounted a cutting blade 48.

Front wall 47 is provided with an opening which permits entrance of mandrel 24 carrying a poultry carcass into cavity 40 and has a predetermined configuration generally adapted to accept the carcass. Opening 47 is wider than cavity or chamber 40 which is provided with a gradual taper adapted to somewhat compress the carcass as it moves rearwardly toward a predetermined final position which defines the cutting zone. In effect the carcass is formly held or retained in position between the walls of cavity 40 and mandrel 24.

Closure member 49 is designed to close most of opening 47 during the cutting operation and to engage a portion of the breast of the carcass to provide the desired containment of the breast portion facing opening 27.

Side wall 42 is provided with slots 50, 52 and 54 which are adapted to slideably receive the cutting blades, described later herein. These slots are aligned with a respective one of slots 38 on one side of mandrel 24. In a similar fashion, side wall 44 includes slots 56, 58 and 60 which are aligned with a respective portion of the slots 38 on the side of mandrel 24 facing side wall 44.

Cutting blade 48 includes a forward portion 48-A and a rearward portion 48-B and functions to make cuts along the breast and also along the length of the back of the poultry carcass mounted on mandrel 24.

Figure 3:
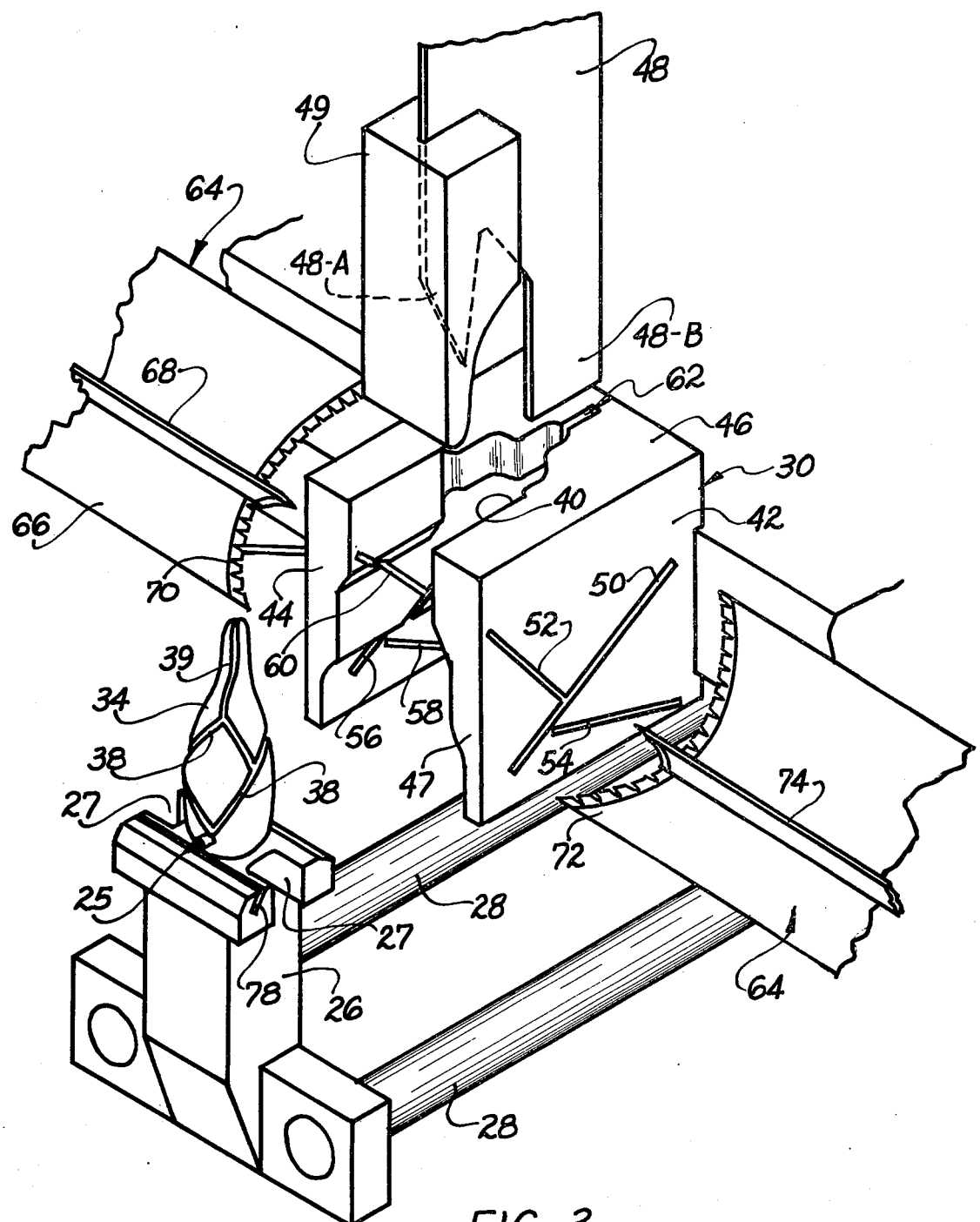
FIG. 3 is a perspective view of a portion of the apparatus shown in FIG. 1 illustrating the mandrel and poultry retaining enclosure which define the loading and cutting stations.

A longitudinal slot 62 is provided in the rearward portion of the enclosure 30 which aids in guiding blade portion 48-B. Also aligned with slot 62 is a slot 64, which is an extension of slot 39, provided on the rearward facing side of mandrel 24 and which is adapted to receive an inner edge of blade portion 48-B. As previously noted, mandrel 24 is provided with slot 39 to accomodate the middle portion of blade 48 and the leading edge of portion 48-A as best seen in FIGS. 3 and 4.

Now referring again to FIGS. 1 and 2, additional cutting blades are provided in the form of a plurality of side blades, indicated generally at 64, on each side of enclosure 30. These side blades are mounted for reciprocal movement into enclosure 30. For illustrative purposes, the blades 64 are shown completely removed from enclosure 30. However, the preferred construction is to have the leading edges always disposed in the slots in enclosure 30 but not extending through the side walls into cavity 40 until actuated.

Figure 2:
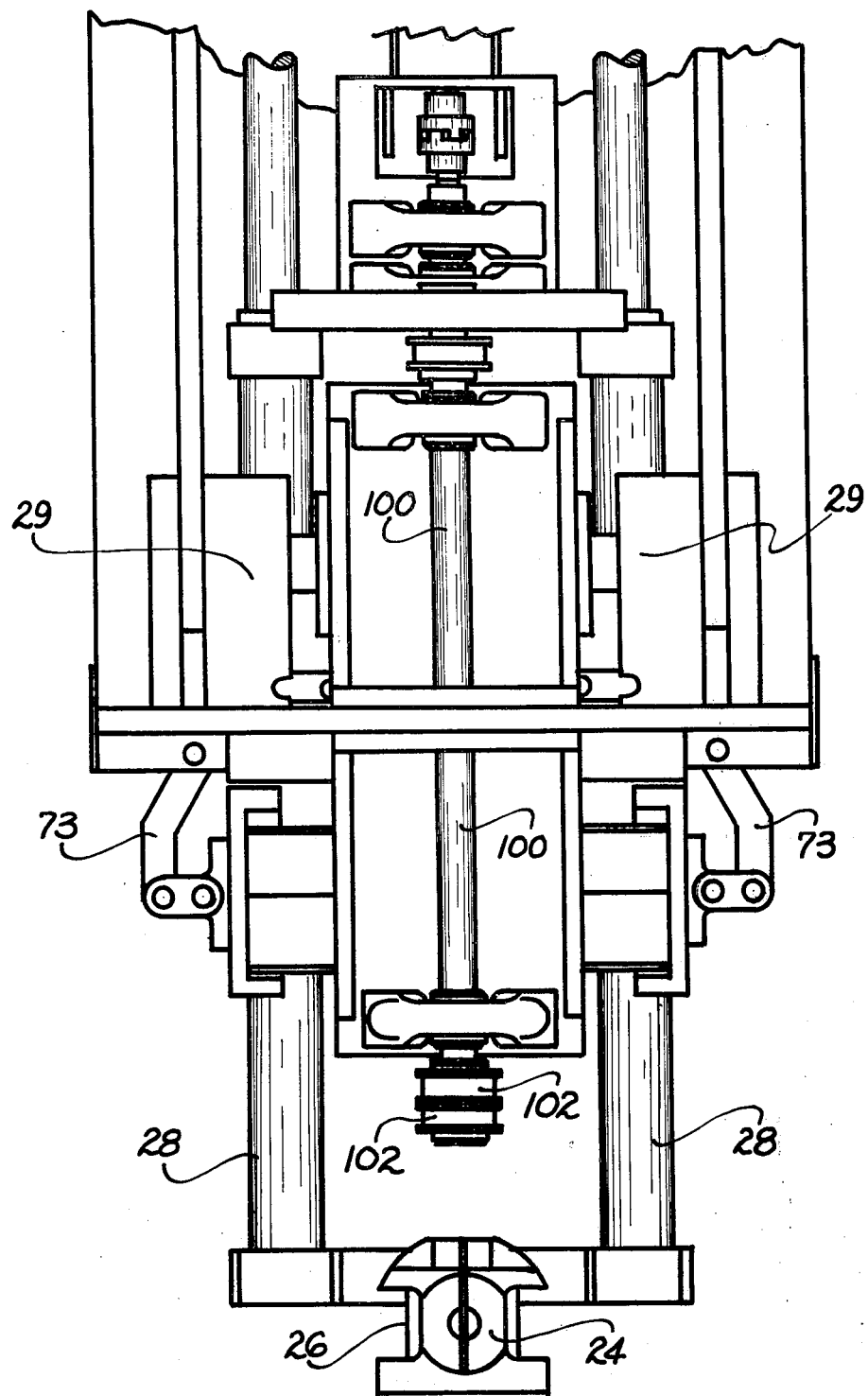
FIG. 2 is a top plan view of the apparatus shown in FIG. 1.

The blades seen on the left of enclosure 30, as viewed in FIG. 2, include a blade 66 aligned with slot 56, blade 68 aligned with slot 60, and blade 70 aligned with slot 58. The blades on the right are similarly constructed and aligned with slots 50, 52 and 54.

The side blades 64, upon actuation by any suitable means such as hydraulic cylinder and link arrangement, indicated generally at 73, are designed to move through the slots as described above and engages a poultry carcass mounted on mandrel 24 and disposed in enclosure 30.

In accordance with the previous description herein, the blades continue through the poultry carcass and enter the slots 38 along the designated area of the poultry carcass to assure severing the carcass into the desired number of selected pieces.

Vertical blade 48 is actuated by an appropriate linkage mechanism, indicated generally at 75, which is operatively connected to a conventional power cylinder and piston, not shown.

It should be noted that the means or mode of power actuation of the cutting blades may be accomplished by a variety of conventional means without departing from the spirit of the present invention. For example, air or electrically driven mechanical power means could be substituted for the preferred hydraulic power described herein. However, the construction and arrangement of the mandrel 24 and cooperating enclosure 30 with the associated blades is very important to accomplish the intended results of the present invention.

Referring to FIGS. 3, 4 and 5, it should be noted that blades 66, 68 and 70 are shaped to conform closely with the curved surface of mandrel 24 along the slots 38. In this manner, the blade surfaces tend to reach around the circumference of the poultry carcass to provide the desired cut.

Blades 72, 74 and 76 on the opposite side of enclosure 30, are similarly constructed, so that the appropriate blade surfaces approach one another near the juncture of slots 38 disposed at the location of the desired breast cut. However, blade portion 48-A will pass between the above blade surfaces.

Blade 70 is designed to sever the leg portion of the carcass as is the corresponding blade 76, not shown, on the opposing side.

A slot 78 is provided in the base of mandrel 24 to receive an edge portion of each of the blades 70 and 76 which not only provides clearance for these blades to pass through the leg portion of the carcass, but also provides additional support as a guide means to lessen any tendency for the blades to deflect from their intended line of travel.

Figure 12:
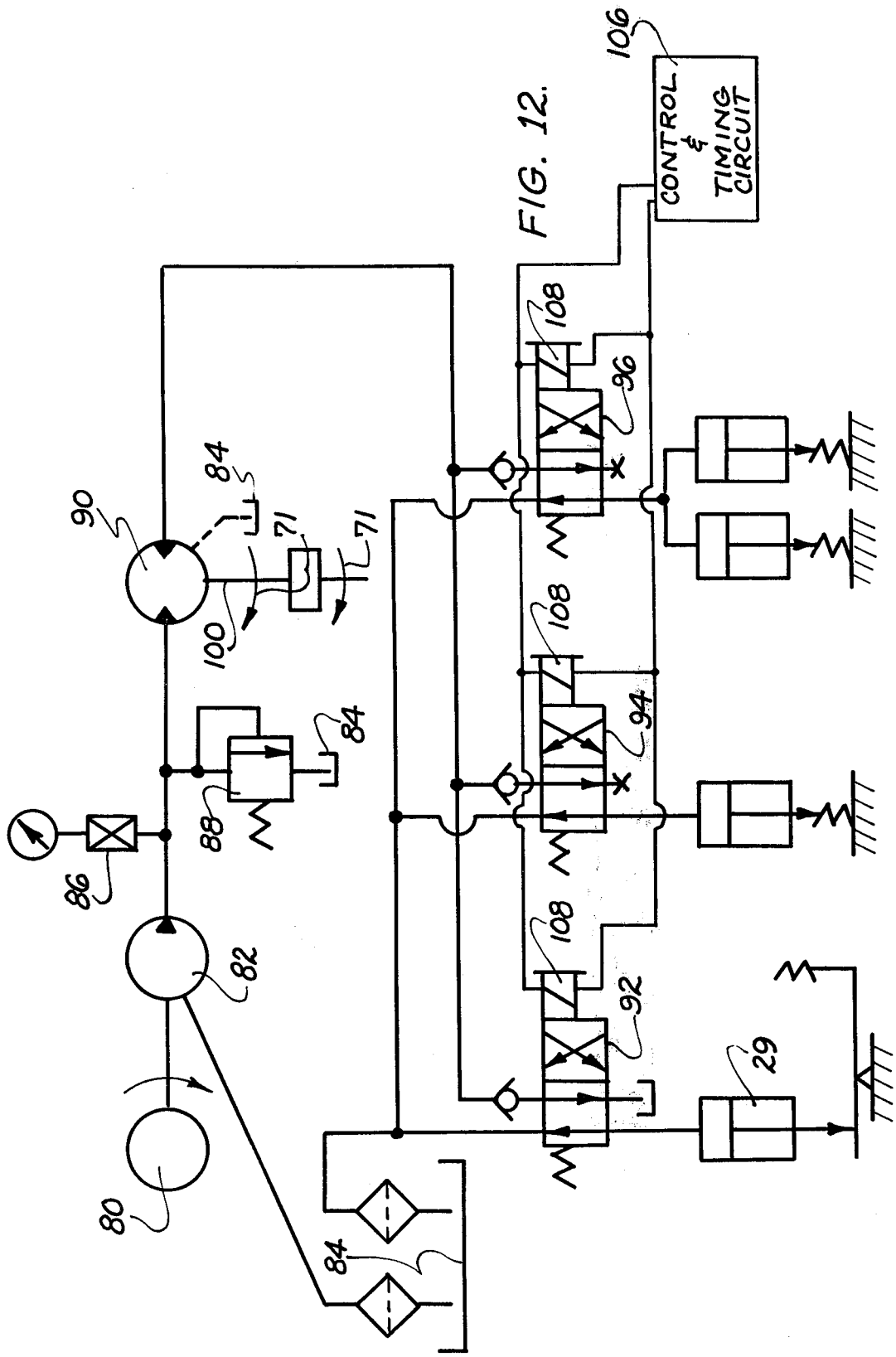
FIG. 12 is a diagrammatic view of a typical circuit constructed in accordance with the present invention.

Now referring specifically to FIG. 12, a schematic view of a suitable hydraulic power system is shown and includes an electric motor 80 operatively connected to a hydraulic pump 82 which is communicated in conventional fashion to a suitable source of oil such as tank 84.

A pressure control valve is provided as at 86 and a relief valve at 88. Pump 82 communicates with a fluid motor 90 which in turn, communicates with conventional solenoid actuated control valve means 92, 94 and 96.

Valve means 92 communicates with a conventional cylinder which actuates piston 29 which in turn drives mandrel 24 to move into enclosure 30.

Valve means 94 actuates a cylinder and piston assembly operatively connected to the linkage indicated at 75 to drive vertical blade 48.

The valve means 96 actuates a pair of conventional cylinder and piston assemblies which are operatively connected to the linkage assemblies 73 which drive side blades 64.

While certain options are available, conventional timing circuits may be employed to control the timing of each valve means such that the blade assemblies are coordinated as desired.

Further, the mandrel and blades may be powered by double acting cylinder and pistons or single acting assemblies with a mechanical spring return. This second option relieves the system of some power requirements.

In the embodiment shown, it is preferred that the vertical blade is actuated first to enable closure member 49 to descend to close opening 47 of enclosure 30. Closure member 49 then, in effect, becomes a portion of enclosure 30 to better contain the carcass in a stable position during the cut.

During actual operation, the time period between actuation of vertical blade 48 carrying closure member 49 and actuation of side blades 64 is very short and for all practical purposes, the carcass is completely severed in what may appear to a casual observer as simultaneously.

Fluid motor 90 also communicates with a driving shaft, not shown, which is operatively connected to a driven shaft 100. A belt drive assembly 102 is operatively connected to shaft 100 and drives a pair of rotary blades 71.

Each blade 71 is disposed on a mounting frame 104 adjacent to the front of enclosure 30 and aligned relative to the line of travel of mandrel 24 to engage a poultry carcass mounted thereon at the wing joint to sever the wings from the carcass prior to entry into enclosure 30.

This arrangement of the rotary cutting blades 71 combined with the forward movement of the mandrel and carcass provides a much improved wing cut which is otherwise relatively difficult to achieve.

A conventional electrical control and timing circuit, such as at 106, is provided and communicates with a solenoid 108 operatively connected to each of the valves 92, 94 and 96.

A manual actuation switch appropriately placed near the loading position of mandrel 24 enables an operator to actuate the cutting cycle after loading a carcass on mandrel 24.

In operation, an operator loads a dressed carcass on mandrel 24 in a position with the breast of the carcass facing the operator and with the legs pulled downwardly through recesses 27 provided in the base of the mandrel.

In mounting the carcass, it should be noted that a protrusion or pin means 25 on the forward portion of mandrel 24 is provided which tends to uplift the lowest portion of the breast of the carcass as seen in FIGS. 4 and 5. In this manner a complete cut of the keel portion of the breast can be obtained by the forwardly disposed portions of blades 70 and 76 without these portions of the blades meeting at the centerline of the carcass.

Then an appropriate switch, not shown, is manually actuated which is operatively connected to timing circuit 106. Mandrel 24 is then actuated to move from the loading position, shown in FIG. 1, into a predetermined position within enclosure 30 which defines a cutting position.

Next, as automatically and sequentially dictated by control circuit 106, vertical blade 48 and enclosure 49 are actuated to move downwardly into the position shown in FIGS. 4 and 5. Then immediately following are side blades 64 which are actuated to move inwardly to sever the carcass.

The movement of the blades are coordinated to then return to their original starting position and mandrel 24 returns to the loading position. The cycle is then repeated.

The severed pieces of the carcass merely fall through the bottom of enclosure 30 wherein a material handling or packaging device may be employed to move the severed pieces away for the next cutting cycle.

It has been found that a single operator working between two adjacent machines can operate at approximately a three second loading and cutting cycle and thereby cut at a rate of 20 carcasses a minute.

Further, the cuts achieved are uniformily consistent and otherwise highly satisfactory. Manual cutting, which is much slower, also tends to be less consistent and varies with the skill and care of the operator. Further, manual cutting is significantly more hazardous to the operator than the automated cutting of the present invention.

Using the present invention, the operator never has to have his hands or any other part of his body in near proximity to any cutting zone.

What is claimed is:

1. An automatic cutting apparatus comprising, in combination, a frame means; a poultry support member including a poultry retaining mandrel mounted on said frame means and adapted to receive a commercially dressed carcass; a poultry retaining enclosure mounted on said frame means and adapted to receive said mandrel having a commercially dressed poultry carcass mounted thereon to define a cutting station to retain said poultry carcass in a stable position, said enclosure provided with a plurality of blade receiving openings, said mandrel and said enclosure being movably mounted in relationship to one another between said cutting station and a loading station defined by said mandrel being disposed outside of said enclosure; a plurality of cutting means disposed adjacent to said cutting station and aligned with said blade receiving openings in said enclosure, said cutting means being movably mounted for force transmitting engagement with a poultry carcass mounted on said mandrel at said cutting station, each of said cutting means being disposed in a predetermined position and provided with a configuration to engage predetermined portions of said poultry carcass for severing said carcass into a plurality of predetermined pieces; drive means operatively connected to said cutting means; and control means operatively connected to said drive means to actuate coordinated movement of said cutting means into engagement with a poultry carcass mounted on said mandrel.

2. The apparatus defined in claim 1 wherein said enclosure means includes a closure member movably mounted between an open position defining an entry opening for receiving said mandrel and poultry carcass and a closed position defining a wall of said enclosure disposed in engagement with a predetermined portion of a poultry carcass disposed in said enclosure.

3. The apparatus defined in claim 1 including a pair of rotating cutting members disposed adjacent to and aligned with the line of travel of said mandrel toward said enclosure means to engage a poultry carcass mounted on said mandrel substantially at the wing joints to sever the wings from the carcass prior to the mandrel entering said enclosure means.

4. In an improved automated poultry cutting apparatus having a poultry retaining mandrel movably mounted between a loading station and a cutting zone and adapted to receive a commercially dressed poultry carcass thereon, the combination of a poultry retaining enclosure means provided with an entrance opening formed to receive said mandrel and the poultry carcass mounted thereon, said enclosure means having inner wall means shaped to generally conform to certain outer dimensions of said poultry carcass to form a chamber defining said cutting zone and a plurality of blade receiving openings provided in predetermined locations in said wall means; a plurality of cutting members disposed in predetermined positions adjacent to said enclosure and movably mounted in alignment with said blade-receiving openings to engage a poultry carcass mounted on said mandrel with said mandrel disposed in said cutting zone in said enclosure means; a movably mounted closure member disposed adjacent to said enclosure means and movable over said entrance opening of said enclosure means in force transmitting engagement with a predetermined portion of a poultry carcass disposed in said enclosure means; drive means for said cutting members; and control means operatively connected to said cutting members for automatic coordinated movement into and out of said cutting zone to sever a poultry carcass mounted therein into a selected number of pieces having predetermined configuration.

5. The apparatus defined in claim 4 wherein said cutting members include at least one member which carries said closure member for said entrance opening of said enclosure means.

6. The apparatus defined in claim 4 including a pair of cutting members disposed adjacent to and aligned with the line of travel of said poultry retaining mandrel toward said enclosure means to engage a poultry carcass mounted on said mandrel substantially at the wing joints to sever the wings prior to the mandrel reaching the enclosure means.

7. A method for cutting a commercially dressed poultry carcass into a selected number of pieces having predetermined configurations comprising the steps of confining a commercially dressed poultry carcass between retaining mandrel disposed in the body cavity of said carcass and an enclosure disposed in surrounding and retaining relationship to the outer portions of said carcass to stabilize said carcass in a predetermined position; causing a plurality of cutting blades to pass through said enclosure and strike said carcass in predetermined locations on said carcass in a predetermined coordinated sequence to sever said carcass into a predetermined number of pieces of selected configurations.

8. The method defined in claim 7 wherein the wing portions of said carcass are severed from the remainder of the carcass prior to said remainder being disposed within said enclosure.

9. In an automatic poultry cutting apparatus having a plurality of reciprocally driven and automatically controlled cutting blades mounted adjacent to a defined cutting zone, the combination of a poultry retaining mandrel provided with a configuration substantially conforming to the inner body cavity of a commercially dressed poultry carcass; and a poultry confining enclosure means having an extrance opening to an inner chamber adapted to receive said mandrel with a poultry carcass mounted thereon, said inner chamber being formed by wall means having a configuration generally conforming to the outline of the poultry carcass mounted on said mandrel and being gradually tapered rearwardly from said entrance opening to engage portions of said carcass in greater force-transmitting relationship the farther said carcass is disposed within said enclosure until a predetermined position is reached which defines a cutting station; said enclosure means being provided with a plurality of blade receiving openings aligned with said cutting blades to enable said blades to enter said enclosure and engage said poultry carcass mounted on said mandrel in a predetermined location; and a closure member movable mounted adjacent to said entrance opening of said enclosure means between open and closed positions relative to said entrance opening.

* * * * *